United States Patent
Murakoshi et al.

(10) Patent No.: US 6,848,274 B2
(45) Date of Patent: Feb. 1, 2005

(54) APPARATUS FOR FORMING GLASS ELEMENTS

(75) Inventors: Hiroshi Murakoshi, Mishima (JP); Shusaku Matsumura, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 105 days.

(21) Appl. No.: 10/241,433

(22) Filed: Sep. 12, 2002

(65) Prior Publication Data
US 2003/0056545 A1 Mar. 27, 2003

(30) Foreign Application Priority Data

| Sep. 21, 2001 | (JP) | .................................. 2001-289669 |
| Sep. 27, 2001 | (JP) | .................................. 2001-297196 |
| Sep. 27, 2001 | (JP) | .................................. 2001-298086 |

(51) Int. Cl.$^7$ ............................................. C03B 11/12
(52) U.S. Cl. .................... 65/319; 65/374.13; 65/374.15
(58) Field of Search ............................ 65/34, 319, 306, 65/374.15, 317, 305, 374.13, 207; 425/406, 407, 412; 100/214, 295

(56) References Cited

U.S. PATENT DOCUMENTS

| 4,983,204 A | * | 1/1991 | Borer et al. ................... 65/273 |
| 5,340,374 A | * | 8/1994 | Komiyama et al. ......... 65/29.12 |
| 5,346,522 A | * | 9/1994 | Komiyama et al. ............. 65/64 |

FOREIGN PATENT DOCUMENTS

| JP | 2001-233624 | 8/2001 |
| JP | 2001-233625 | 8/2001 |
| JP | 2001-233626 | 8/2001 |

OTHER PUBLICATIONS

Machine translation of JP 2001233625 A, retrived from www.jpo.gov on Feb. 10, 2004.*
Machine translation of JP 2001233624 A, retrived from www.jpo.gov on Feb. 10, 2004.*
Machine translation of JP 2001233626 A, retrived from www.jpo.gov on Feb. 10, 2004.*

* cited by examiner

Primary Examiner—Steven P. Griffin
Assistant Examiner—Carlos Lopez
(74) Attorney, Agent, or Firm—Pillsbury Winthrop LLP (57) ABSTRACT

Provided is an apparatus for forming glass elements, which includes top and bottom die assemblies, each of the die assemblies comprising a core mold, a mold die which supports the core mold, and a die plate, and a glass material being interposed between the top and bottom core molds, a first fastening member, which fastens the mold die and bottom die plate of the bottom die assembly together, a second fastening member, which fastens the die plate of the bottom die assembly and the heat insulating cylinder together, a third fastening member, which fastens the mold die and die plate of the top die assembly together, and a fourth fastening member, which fastens the die plate of the top die assembly and the heat insulating cylinder together. Each of the first to fourth fastening members is made of a material selected from the group consisting of carbon and molybdenum.

7 Claims, 4 Drawing Sheets

APPARATUS FOR FORMING GLASS ELEMENTS

CROSS-REFERENCE TO RELATED APPLICATIONS

This application is based upon and claims the benefit of priority from the prior Japanese Patent Applications No. 2001-289669, filed Sep. 21, 2001; No. 2001-297196, filed Sep. 27, 2001; and No. 2001-298086, filed Sep. 27, 2001, the entire contents of all of which are incorporated herein by reference.

BACKGROUND OF THE INVENTION

1. Field of the Invention

The present invention relates to an apparatus for forming glass elements such as glass lenses and prisms and, more particularly, to an apparatus for forming glass elements which forms glass elements by interposing a glass material between a pair of dies, which are engageable with each other and can open and close, heating the dies and glass material, and pressing the glass material.

2. Description of the Related Art

Methods for manufacturing glass elements such as glass lenses that are required to provide high accuracy are broadly divided into two. One is to form a molten glass material to a shape close to that of a final formed article and to grind and polish this formed article thereby to finish it. In the other method, a glass material formed to the weight and shape corresponding to a final formed article is heated and finished by performing reheat pressing by use of precision dies.

In the former manufacturing method by grinding and polishing, a dozen or so steps are required for forming curved surfaces. In addition, large amounts of glass grinding dust harmful to workers are generated. Moreover, this manufacturing method has another disadvantage that it is difficult to manufacture high-value added glass elements having optical surfaces of aspherical surface shape with the same accuracy and in large quantities.

In contrast, in the latter manufacturing method by reheat pressing, a glass element is formed by printing the shape of dies onto a glass material. For this reason, only one step of press forming is necessary for forming curved surfaces and, at the same time, it becomes possible to carry out manufacturing in a clean environment. Furthermore, this manufacturing method has another advantage that once dies are fabricated, large quantities of glass elements can be manufactured according to the accuracy of the dies.

Incidentally, when usual optical glass elements are formed by reheat pressing, the forming temperature is 700° C. at the highest and cemented carbide alloys are generally used as die materials. Therefore, in terms of thermal expansion, materials having coefficients of linear expansion close to those of cemented carbide alloys or ceramics are used in bolts which fasten the above-described dies and heat insulating cylinders, which adjoin the dies and are usually made of ceramics. Usually, cemented carbide alloys, tungsten alloys, etc. are used.

However, in the case of glass materials of high melting point such as silica glass, which requires a forming temperature of about 1400° C., if fastening bolts of the same material as in the forming of usual optical glass elements are used, looseness would occur in the bolts. Furthermore, in terms of heat resistance, the use of such fastening bolts had the problem that strength decreases extremely, resulting in an early breakdown.

In an apparatus for forming glass elements, in order to prevent heat emitted from top and bottom die assemblies from transferring to a moving shaft and a fixed shaft, heat insulating cylinders made of ceramics of low thermal conductivity are interposed between the top and bottom die assemblies and these shafts. When a usual optical glass is formed, the forming temperature is about 700° C. at the highest and heat is sufficiently insulated by interposing heat insulating cylinders made of ceramics. However, in the case of glass materials of high melting point such as silica glass, which requires a forming temperature of about 1400° C., the heat insulating cylinders are heated together with the dies during the heating of the glass materials and this had the problem that the durability of the heat insulating cylinders decreases or the heat insulating cylinders are broken down.

In addition, when glass materials are heated by use of an infrared lamp, it is necessary to cool the infrared lamp itself in order to protect the infrared lamp from the heat generation from the infrared lamp itself. For this purpose, it is effective to thermally isolate the top and bottom die assemblies and the infrared lamp from each other by arranging the infrared lamp outside a formation chamber in which the top and bottom die assemblies etc. are housed. In order to arrange the infrared lamp outside the formation chamber, it is necessary that the formation chamber allow the transmission of infrared rays, and conventionally, silica glass of high infrared transmittivity is used.

Moreover, in order to prevent the oxidation of dies made of metal etc., it is necessary to eliminate oxygen near the dies. And there has been adopted a method which involves confining the dies and glass material within the formation chamber and purging oxygen by filling the formation chamber with an inert gas or a method which involves evacuating the interior of the formation chamber.

However, it is difficult to fabricate the whole formation chamber from silica glass. Therefore, the formation chamber is designed in such a manner that a side surface portion from which the top and bottom die assemblies and glass material are irradiated with infrared rays is covered with a silica glass tube and other portions from which irradiation with infrared rays is not performed are fabricated from metal etc. and that in order to increase the sealing performance of the formation chamber, the space between the silica glass and the metal is sealed with O-rings.

In the case of forming of glass materials which require high forming temperatures such as silica glass, the forming temperatures are as high as 1350° C. to 1600° C. or so and the silica glass tube is partially heated to temperatures of not less than 500° C. or so even when the silica glass tube is air cooled. Therefore, due to the heat transfer from the silica glass tube, the O-rings in contact with the silica glass tube are also heated. Furthermore, because infrared rays reach the O-rings while reflecting within the silica glass, the O-rings are also heated even when they are installed in places remote from the infrared lamp. For this reason, it is necessary to use expensive heat resistant materials as O-ring materials. However, even in this case, there was a problem of short life and frequent replacement, which is unfavorable in terms of cost.

BRIEF SUMMARY OF THE INVENTION

An object of the present invention is to provide an apparatus for forming glass elements in which even at forming temperatures of not less than 1000° C. as with silica glass, there occurs no looseness of fastening members which fasten core molds and members near the core molds and, at the same time, the fastening members are not broken down.

Another object of the invention is to provide an apparatus for forming glass elements in which a decrease in the durability of heat insulating cylinders is prevented when glass materials which require high forming temperatures such as silica glass are formed by reheat pressing.

A further object of the invention is to provide an apparatus for forming glass elements in which even at high forming temperatures of not less than 1000° C. as with silica glass, a forming chamber can be sealed for a long time by extending the life of O-rings.

In order to achieve these objects, the invention has the following features.

1. There is provided an apparatus for forming glass elements, which comprises: a moving shaft and a fixed shaft, which are disposed in a vertical positional relation to each other; heat insulating cylinders, which are attached to these shafts; top and bottom die assemblies, which are attached respectively to each of these heat insulating cylinders, each of the die assemblies comprising a core mold, a mold die which supports the core mold, and a die plate, and a glass material being interposed between the top and bottom core molds; a first fastening member, which fastens the mold die and die plate of the bottom die assembly together; a second fastening member, which fastens the die plate of the bottom die assembly and the heat insulating cylinder together; a third fastening member, which fastens the mold die and die plate of the top die assembly together; and a fourth fastening member, which fastens the die plate of the top die assembly and the heat insulating cylinder together. Each of the first to fourth fastening members is made of a material selected from the group consisting of carbon and molybdenum.
2. The apparatus described in 1 above further comprises: a forming chamber, which is formed so as to surround the top and bottom die assemblies and the heat insulating cylinders; infrared heating means, which is disposed along the outer periphery of the forming chamber so as to surround the peripheries of the top and bottom die assemblies; and a reflecting mirror, which reflects heat emitted from the infrared heating means in the direction of the top and bottom die assemblies.
3. In the apparatus described in 1 above, a heat insulating spacer is interposed between each heat insulating cylinder and each shaft. Each heat insulating cylinder is made of silicon carbide and each heat insulating spacer is made of silicon nitride.
4. There is provided an apparatus for forming glass elements, which comprises: a moving shaft and a fixed shaft, which are disposed in a vertical positional relation to each other; heat insulating cylinders, which are attached to these shafts; top and bottom die assemblies, which are attached respectively to each of these heat insulating cylinders, each of the die assemblies comprising a core mold, a mold die which supports the core mold, and a die plate, and a glass material being interposed between the top and bottom core molds; means for heating the top and bottom die assemblies and glass material; and a heat insulating spacer, which is interposed between each shaft and each heat insulating cylinder.
5. In the forming apparatus described in 4 above, the heat insulating spacer is made of ceramics having heat resistance and capable of keeping strength at a temperature at which the top and bottom die assemblies and glass material are heated.
6. In the forming apparatus described in 4 above, the heat insulating cylinder is made of silicon carbide and the heat insulating spacer is made of silicon nitride.
7. The forming apparatus described in 5 above further comprises: a forming chamber, which is formed so as to surround the top and bottom die assemblies and of the heat insulating cylinders; infrared heating means, which is disposed along the outer periphery of the forming chamber so as to surround the peripheries of the top and bottom die assemblies; and a reflecting mirror, which reflects heat emitted from the infrared heating means in the direction of the top and bottom die assemblies.
8. There is provided an apparatus for forming glass elements, which comprises: a forming chamber, which has a closed space formed by a transparent quartz tube and plates provided above and below the transparent quartz tube; top and bottom die assemblies, which are disposed within this forming chamber, a glass material being disposed between these top and bottom die assemblies; infrared heating means, which is disposed around the outer periphery of the transparent quartz tube and heats the glass material and top and bottom die assemblies; a sealing member, which is provided in each of the plates and prevents the inflow of air into the forming chamber by sealing a space between the plate and the transparent quartz tube; shielding plates, each of the shielding plate being disposed between the infrared heating means and the sealing member and shutting off radiant heat from the infrared heating means to the sealing member; and cooling means, which cools an outer peripheral surface of the transparent quartz tube present between the shielding plate and each plate by forcedly causing air to flow thereto.
9. In the forming apparatus described in 8 above, the sealing member is an O-ring, which is selected from a group consisting of fluorocarbon resins and silicone resins.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Figure 1:
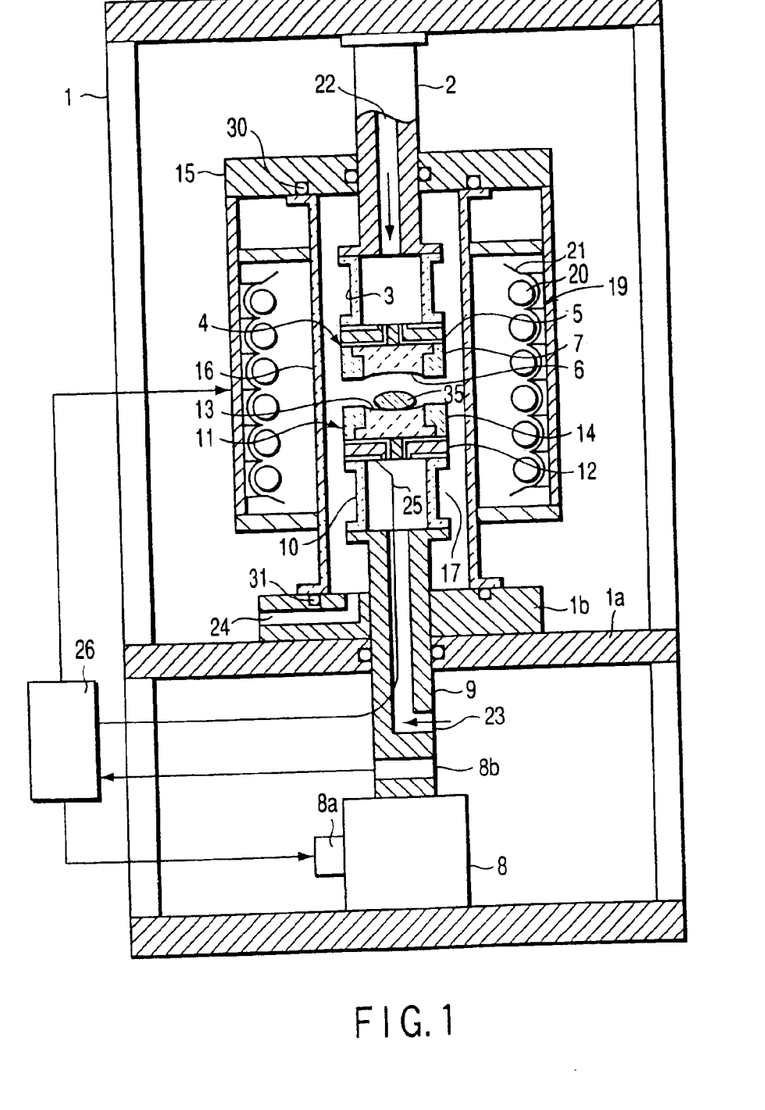
FIG. 1 is a general schematic sectional view of a forming apparatus in an example of the invention.

An embodiment of the invention will be described below by referring to FIGS. 1 and 2. FIG. 1 is a sectional view of the whole of a forming apparatus. In this apparatus, a drive unit (a die opening and closing device) 8 such as a screw jack is attached to the lower part of a frame 1. This drive unit uses a servomotor 8a as the drive source and converts the rotational movement of the servomotor 8a to a linear movement thrust. A moving shaft 9 is attached to the drive unit 8 through a load sensor 8b. At the top end of the moving shaft 9 is attached a bottom die assembly 11 through a heat insulating cylinder 10 made of ceramics. This bottom die assembly 11 comprises a die plate 12, a bottom core mold 13 and a mold die 14.

The top end of a fixed shaft 2 is attached to the upper part of the frame 1, and a top die assembly 4 is attached to the bottom end of the fixed shaft 2 through a heat insulating cylinder 3 made of ceramics. This top die assembly 4 comprises a die plate 5, a top core mold 6 and a mold die 7.

To the above-described fixed shaft 2 is movably engaged a bracket 15, which is moved up and down by a drive unit (not shown). The top-end flange portion of a transparent quartz tube 16, which surrounds the top and bottom die assemblies 4, 11 and the heat insulating cylinders 3, 10, is attached to the bracket 15 through an O-ring 30. The bottom-end flange portion of this transparent quartz tube 16 abuts against the top surface of a mounting seat 1b attached to an intermediate bracket 1a through an O-ring 31. The transparent quartz tube 16, bracket 15 and mounting seat 1b together form an airtight forming chamber 17 around the top and bottom die assemblies 4, 11 and heat insulating cylinders 3, 10. Water cooled tubes (not shown) are built in the bracket 15 and mounting seat 1b to cool the sealing O-rings 30, 31.

An outer cylinder 18, along with the transparent quartz tube 16, is attached to the bracket 15, and a lamp unit 19 to heat the top core mold 6, the bottom core mold 13 and a glass material 35 is attached to the outer cylinder 18 so as to surround the transparent quartz tube 16. The above-described lamp unit 19 is provided with an infrared lamp 20, a reflecting mirror 21 disposed behind the infrared lamp 20, and a water cooled pipe (not shown) to cool the reflecting mirror 21.

The above-described fixed shaft 2 and moving shaft 9 are provided with a gas supply line 22 and a gas supply line 23, respectively. These gas supply lines 22, 23 supply an inert gas to the interior of a forming chamber 17 thereby to produce an inert gas atmosphere in the interior of the forming chamber and/or to cool the top and bottom core molds 6, 13. An exhaust port 24 to exhaust air or the inert gas from the forming chamber 17 is provided in the mounting seat 1b.

In FIG. 1, the numeral 26 denotes a controller. The controller 26 enters the output from the load sensor 8b and the output from a thermocouple 25 for temperature detection attached to the bottom die assembly 11, and drives the servomotor 8a on the basis of these outputs and a program which has been stored beforehand, thereby controlling the speed, position and pressing force of the moving shaft 9 and also controlling the output of the lamp unit 19 and the supply of the inert gas to perform desired forming.

Figure 2:
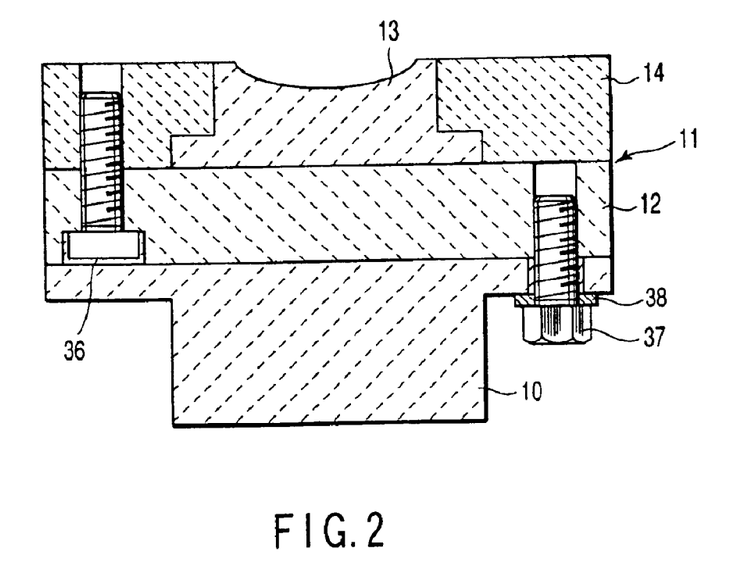
FIG. 2 is an enlarged sectional view of the bottom die assembly of FIG. 1.

FIG. 2 is an enlarged view of the bottom die assembly 11. As shown in FIG. 2, the mold die 14 holds the bottom core mold 13 in place and the mold die 14 and die plate 12 are fastened together by a bolt 36 as a fastening member. The die plate 12 and heat insulating cylinder 10 are fastened together by a blot 37 as a fastening member and a washer 38.

The mold die 14 and die plate 12 are made of carbon, which is a material having excellent heat resistance, high-temperature strength and thermal shock resistance. The heat insulating cylinder 10 is made of silicon carbide, which is a material having high hardness and excellent heat resistance and corrosion resistance. And the bolts 36, 37 and washer 38 are made of either of carbon or molybdenum, which is a material having excellent heat resistance and high strength.

As is apparent from FIG. 1, the construction of the top die assembly 4 is such that the top and bottom of the bottom die assembly 11 are reversed, and the construction of the tightening members of the top die assembly is the same as in the case of the bottom die assembly. The materials for the mold die 7, die plate 5, heat insulating cylinder 3, bolts and washer of the top die assembly 4 are the same as the materials for the mold die 14, die plate 12, heat insulating cylinder 10, bolts 36, 37 and washer 38 of the bottom die assembly 11. Therefore, a description by an enlarged view of the top die assembly 4 is omitted.

A forming apparatus of this construction is used as follows. With the moving shaft 9 kept in a lowered position, the glass material 35 is placed on the bottom core mold 13, an inert gas is supplied from the gas supply lines 22, 23 thereby to produce an inert gas atmosphere in the interior of the forming chamber 17, and the top and bottom core molds 6, 13 and glass material 35 are heated by use of the lamp unit 19.

When the temperature of the top and bottom core molds 6, 13 has reached a prescribed pressing temperature which was set beforehand and has become stable, the moving shaft 9 is raised and the top and bottom core molds 6, 13 are closed, whereby pressing is performed. The servomotor 8a is driven by a program input to the controller 26 and the moving shaft 9 moves up and down with the speed, position and pressing force controlled.

Subsequently, the output of the lamp unit 19 is lowered and the supply volume of inert gas from the gas supply lines 22, 23 is controlled, whereby the temperature of the top and bottom core molds 6, 13 is lowered with a prescribed temperature gradient and a shift to the cooling step is made. Also during this cooling step, pressing is continued by controlling the pressing force by the moving shaft 9.

When the temperature of the bottom core mold 13 has dropped to a temperature near a transition temperature point, the pressing force of the moving shaft 9 is released. When the temperature of the bottom core mold 13 has dropped further, the top and bottom core molds 6, 13 are opened, the supply of the inert gas to the forming chamber 17 is simultaneously stopped, and the forming chamber 17 is opened to take out a glass element obtained by forming the glass material 35.

In this process of glass element forming, the bolt 36 firmly fastens the mold die 14, which holds the bottom core mold 13 in place, and the die plate 12 in a disassemblable and connectable manner. Also, the bolt 37 firmly fastens the die plate 12 and heat insulating cylinder 10 in a disassemblable and connectable manner. However, when the bottom die assembly 11 has been heated, in a case where the coefficient of linear expansion of the bolts 36, 37 is larger that that of the die plate 12, mold die 14 and heat insulating cylinder 10, the elongation of the bolts 36, 37 becomes larger and hence the bolts 36, 37 become loose. On the other hand, in a case where the coefficient of linear expansion of the bolts 36, 37 is smaller that that of the die plate 12, mold die 14 and heat insulating cylinder 10, the elongation of the die plate 12, mold die 14 and heat insulating cylinder 10 becomes larger and hence a tensile force acts on the bolts 36, 37. If a tensile force acts repeatedly, the bolts become elongated and loose.

When a tensile force acts on the bolts 36, 37, the temperature rises and falls repeatedly between about 200° C. during the taking-out of a formed article and about 1400° C., which is the forming temperature, and hence a tensile force acts on the bolts 36, 37 repeatedly. If bolts of conventional material are used, the strength of the bolts decrease at high temperatures and, therefore, the bolts 36, 37 will be broken down in a short time. At a temperature of 1400° C., conventional bolts, which have neither heat resistance nor high-temperature strength, become deformed. In contrast, either carbon or molybdenum, which has heat resistance and high-temperature strength during the formation of a glass having a high melting point at 1400° C., is used in the invention as the material for bolts, the looseness of the bolts does not occur and no breakdown in a short time occurs because an extreme decrease in strength due to the heat resistance problem does not arise.

Embodiment 1

In order to confirm the fastening effect of the bolt 36, a test was carried out on the basis of assumed forming of silica glass by heating the top die assembly 4 and bottom die assembly 11 to 1400° C. and cooling the top and bottom die assemblies 4, 11 to 200° C. The test was carried out 200 times each, and whether looseness and breakdown of the bolt 36 occurs was ascertained. TABLE 1 shows the results of the test of the bolt 36 of the invention.

As shown in TABLE 1, in the test the die plate 12, the moving die 14, and the bolt 36 which fastens the die plate 12 and mold die 14 together were made of a carbon material.

For the purpose of making a comparison, a similar test was conducted by use of the same material as in TABLE 1 for the die plate 12 and mold die 14 but the material for the fastening bolt 36 changed to a tungsten alloy as shown in TABLE 2.

As is apparent from the test results shown in TABLE 2, in the case of the bolt 36 made of a tungsten alloy, the shape of the bolts 36, 37 was deformed and looseness occurred. However, in the case of the bolt 36 made of carbon, neither looseness nor breakdown occurred as shown in TABLE 1.

It could be ascertained that the bolt 36 which fastens die plate 12 and mold die 14 together is effective when a carbon material is used.

TABLE 1

| | Pattern | | | |
|---|---|---|---|---|
| | | | | Bolt 37, Washer 38 (Material) Molybdenum |
| | Bolt 36: (Material) Carbon | | | Heat insulating |
| Frequency | Moving die 14 (Material) Carbon | Die plate 12 (Material) Carbon | Die plate 12 (Material) Carbon | cylinder 10 (Material) Silicon carbide |
| 200 | No looseness, no breakdown | | No looseness, no breakdown | |

TABLE 2

| | Pattern | | | |
|---|---|---|---|---|
| | Bolt 36: (Material) | | | Bolt 37, Washer 38 (Material) Tungsten alloy |
| | Tungsten alloy | | | Heat insulating |
| Frequency | Moving die 14 (Material) Carbon | Die plate 12 (Material) Carbon | Die plate 12 (Material) Carbon | cylinder 10 (Material) Silicon carbide |
| 200 | Looseness occurred | | Looseness occurred | |

Embodiment 2

In order to confirm the fastening effect of the bolt 37, a test was carried out in the same manner as in the first embodiment by heating the top die assembly 4 and bottom die assembly 11 to 1400° C. and cooling the top and bottom die assembly 4, 11 to 200° C. The test was carried out 200 times each, and whether looseness and breakdown of the bolt 37 occurs was ascertained. TABLE 1 shows the results of the test of the bolt 37 of the invention.

As shown in TABLE 1, in the test the die plate 12 was made of carbon, the heat insulating cylinder 10 was made of silicon carbide, and the bolt 37 which fastens the die plate 12 and heat insulating cylinder 10 together was made of a molybdenum material.

For the purpose of making a comparison, a similar test was conducted by use of the same material as in TABLE 1 for the die plate 12 and heat insulating cylinder 10 but the material for the fastening bolt 37 and washer 38 changed to a tungsten alloy as shown in TABLE 2.

As is apparent from the test results shown in TABLE 2, in the case of the bolt 37 made of a tungsten alloy, looseness occurred. However, in the case of the bolt 37 made of molybdenum, neither looseness nor breakdown occurred as shown in TABLE 1.

It could be ascertained that the bolt 37 which fastens die plate 12 and heat insulating cylinder 10 together is effective when molybdenum is used.

From the above-described embodiments, it was ascertained that even in the case where a glass of high melting point such as silica glass is formed, by using a bolt of carbon material and a bolt of molybdenum as tightening members for the peripheral portions of core molds, it is possible to provide an apparatus for forming glass elements in which there is no possibility that the bolts become loose or are broken down due to an extreme decrease in strength because of the heat resistance problem.

Figure 3:
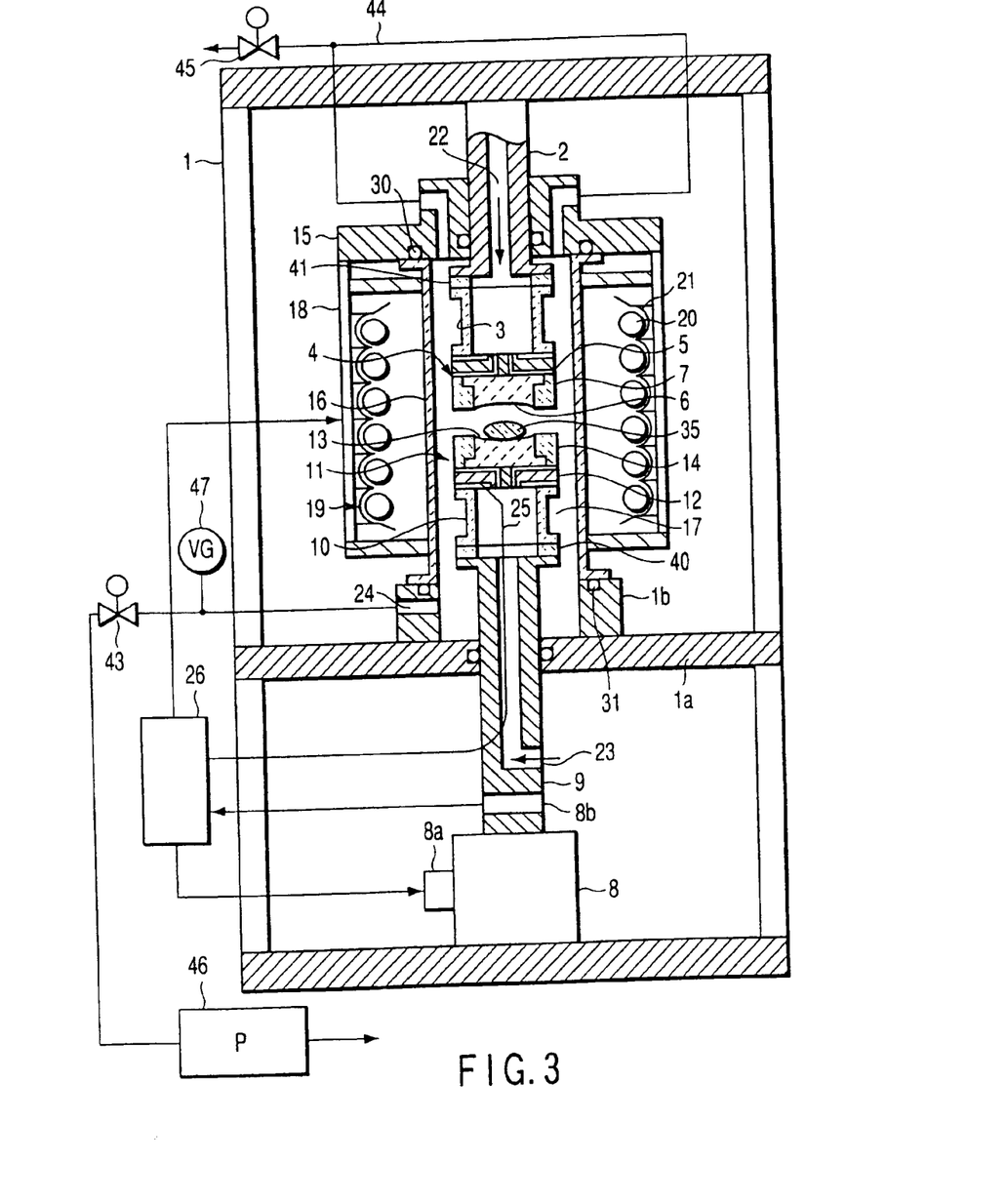
FIG. 3 is a general schematic sectional view of a forming apparatus in another example of the invention.

FIG. 3 shows a forming apparatus in another embodiment of the invention. The same parts as in the forming apparatus of FIG. 1 are given the same reference numerals as in FIG. 1 and their descriptions are omitted. What is characteristically different from the forming apparatus of FIG. 1 resides in the point that in the forming apparatus of FIG. 3, heat insulating spacers 40, 41 are interposed respectively between the moving shaft 9 and the heat insulating cylinder 10 and between the fixed shaft and the heat insulating cylinder 3. These heat insulating spacers 40, 41 are made of a heat resistant material, such as silicon nitride and silicon carbide, and a ceramics material which is a high-strength material.

With the apparatus for forming glass elements according to the invention, even in the press forming of materials that require high forming temperatures such as silica glass, by combining heat insulating cylinders and heat insulating spacers, it is possible to produce a heat insulating effect between die assemblies and shafts and hence no abnormality occurs in the heat insulating cylinders. In this case, the die assemblies are made of ceramics or carbon, and the heat insulating cylinders and heat insulating spacers are made of a heat resistant material, such as silicon nitride and silicon carbide, and a ceramics material, which is a high-strength material. In particular, the heat insulating cylinders are made of silicon carbide and the heat insulating spacers are made of silicon nitride.

According to the invention, because of the presence of the spacers between the shafts and the heat insulating cylinders, the heat insulating cylinders are not heated together with the die assemblies or become less apt to be heated during the heating of a glass material. This will be concretely described below in a case where the heat insulating cylinders are made of silicon carbide and the heat insulating spacers are made of silicon nitride. Because the strength of silicon carbide at not less than 1200° C. is higher that of silicon nitride, the heat insulating cylinders are made of silicon carbide. However, the thermal conductivity of silicon carbide is as high as 63.0 W/m·K. Therefore, if the shafts are directly connected to the heat insulating cylinders, the flow of heat from the die assemblies to the shafts through the heat insulating cylinders would be large and stress concentration would occur in the corners portions of the heat insulating cylinders etc., with the result that these portions become apt to be broken down. Therefore, the heat insulating spacers of silicon nitride are interposed between the heat insulating cylinders and the shafts. The strength of silicon nitride at not more than 900° C. is higher than that of silicon carbide and the thermal conductivity of silicon nitride is as low as 12.6 W/m·K. Therefore, the flow of heat from the die assemblies to the shafts is suppressed by the heat insulating spacers having a low thermal conductivity and loads to the heat insulating cylinders are reduced, whereby it is possible to prevent a breakdown of the heat insulating cylinders. Incidentally, when the heat insulating spacers have deteriorated, it is necessary only that the heat insulating spacers alone be replaced.

Incidentally, in FIG. 3, the numeral 43 denotes a vacuum valve, the numeral 44 a gas exhaust line, the numeral 45 a gas exhaust valve, the numeral 46 an evacuation device, and the numeral 47 a vacuum gauge.

Embodiment 3

A test was carried out on this apparatus. In the test, carbon was used for the die plate and mold die, silicon carbide was used as the material for the heat insulating cylinders, and silicon nitride was used as the material for the heat insulating spacers.

In the test, at 1400° C., which is the forming temperature of silica glass (ES: Nippon Silica Glass Co., Ltd.), press forming was carried out at a pressing force of 20 kN in an inert gas atmosphere and a reduced-pressure atmosphere ($5 \times 10^{-1}$ Pa) and it was ascertained that the heat insulating cylinders are not broken down. Furthermore, continuous forming was carried out 200 times under the above-described conditions and it was ascertained that the heat insulating cylinders are not broken down and that the endurance of the heat insulating cylinders is improved.

From this embodiments, it was ascertained that according to the invention, even in the case where a glass of high melting point such as silica glass is formed in an inert gas atmosphere or a reduced-pressure atmosphere, the prevention of a breakdown of the heat insulating cylinders and an improvement in the durability of the heat insulating cylinders can be achieved and hence glass elements of a glass of high melting point such as silica glass can be easily formed.

Figure 4:
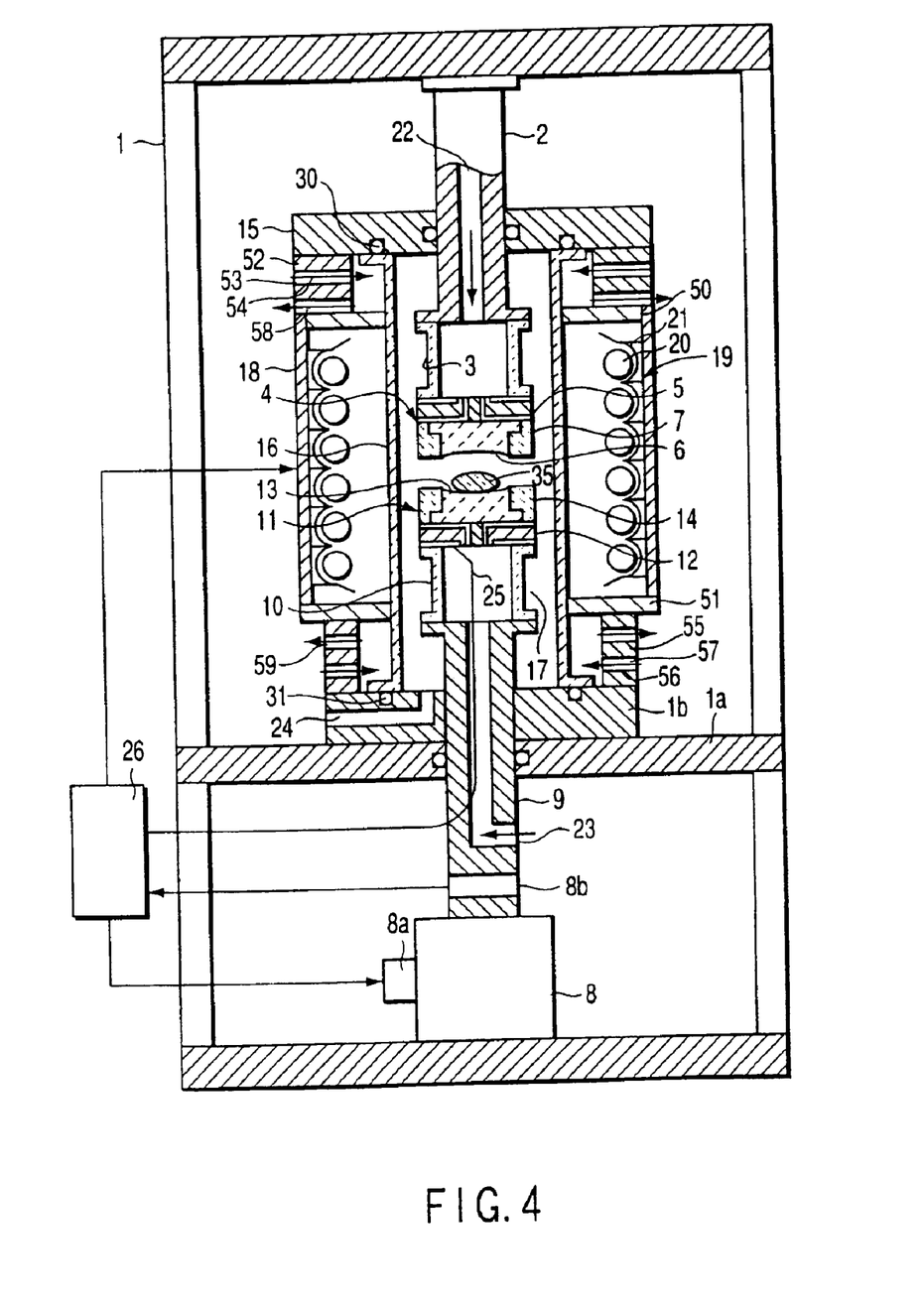
FIG. 4 is a general schematic sectional view of a forming apparatus in a further example of the invention.

FIG. 4 shows a forming apparatus in a further example of the invention. The same parts as in the forming apparatus of FIG. 1 are given the same reference numerals as in FIG. 1 and their descriptions are omitted. The forming apparatus of FIG. 4 is characteristically different from the forming apparatus of FIG. 1 in the following point. In the forming apparatus of FIG. 4, above and below a lamp unit 19, which is disposed around the transparent quartz tube 16, are provided shielding plates 50, 51, which shut off the radiant heat to O-rings 30, 31, with a small gap from the transparent quartz tube 16.

A top spacer 52 is provided between a bracket 15 and the shielding plate 50, and a plurality of air supply lines 53 are circumferentially provided in the top spacer 52. And from these air supply lines 53, the quartz tube cooling air 54 is blown to the bracket 15 and an area near a top flange portion of a transparent quartz tube 16 in abutment with the O-ring 30. A bottom spacer 55 is provided between a mounting seat 1b and the shielding plate 51, and a plurality of air supply lines 56 are circumferentially provided in the bottom spacer 55. And from these air supply lines 56, the quartz tube cooling air 57 is blown to the mounting seat 1b and an area near a bottom flange portion of the transparent quartz tube 16 in abutment with the O-ring 31. The top and bottom spacers 52, 55 are, respectively, provided with exhaust ports 78, 59 to exhaust air.

Embodiment 4

In order to confirm the effect of the shielding plates 50, 51 provided above and below the lamp unit 19 and of the quartz tube cooling air 54, 57, a test was carried out on the basis of assumed forming of silica glass by heating the top and bottom core molds 6, 13 and glass material 35 to 1400° C. and cooling the top and bottom core molds 6, 13 and glass material 35 to 200° C. after holding for 120 seconds. In the test, a white silicone resin and a black fluorocarbon resin were used as the materials for the O-rings 30, 31. The test was carried out with the shielding plates kept attached. The test was carried out in a case where the quartz cooling air 54, 57 is used and in a case where the quartz cooling air 54, 57 is not used.

The test was conducted 200 times each, and changes in the appearance of the O-rings 30, 31 and the occurrence of leakage from a forming chamber 17 were investigated. TABLES 3 and 4 show the results of the test to investigate the effect of the quartz tube cooling air according to the invention.

As shown in TABLE 3, in a case where black fluorocarbon resin O-rings were used and the quartz tube cooling air 54, 57 was not used, smoke generated when the test repeated 5 times and melting occurred. In contrast, in a case where black fluorocarbon resin O-rings were used and the quartz tube cooling air 54, 57 was used, no abnormality was observed even when the test was repeated 200 times. Thus, it could be ascertained that the use of the quartz tube cooling air 54, 57 is effective.

On the other hand, in a case where white silicone resin O-rings were sued and the quartz tube cooling air 54, 57 was not used, as shown in TABLE 4, slight discoloration occurred when the test was repeated 100 times, and discoloration and leakage occurred when the test was repeated 200 times. In contrast, in a case where white silicone resin O-rings were used and the quartz tube cooling air 54, 57 was used, no abnormality was observed even when the test was repeated 200 times. Thus, it could be ascertained that that the use of the quartz tube cooling air 54, 57 is effective. From the above-described test results, it was ascertained that the air cooling of an area near the flange portion of the transparent quartz tube 16 is effective irrespective of the material and color of the O-rings 30, 31.

As is apparent from the above-described results, according to the invention, by installing the shielding plates which shut off the radiant heat to the O-rings above and below the infrared lamp and, at the same time, by forcedly cooling the plates provided above and below the transparent quartz tube and areas near the top and bottom flanges of the transparent quartz tube in contact with the O-rings, the life of the O-rings is extended, and it was ascertained that it is possible to provide an apparatus for forming glass elements in which the forming chamber can be sealed for a long time even at forming temperatures of not less than 1000° C. as in the forming of silica glass.

TABLE 3

| | Pattern | |
| | Black fluorocarbon resin O-ring | |
| Frequency | Non use of quartz tube cooling air | Use of quartz tube cooling air |
| --- | --- | --- |
| 5 | Smoke generation and melting | No abnormality |
| 20 | — | No abnormality |
| 100 | — | No abnormality |
| 200 | — | No abnormality |

TABLE 4

| | Pattern | |
| | White silicone resin O-ring | |
| Frequency | Non use of quartz tube cooling air | Use of quartz tube cooling air |
| --- | --- | --- |
| 5 | No abnormality | No abnormality |
| 20 | No abnormality | No abnormality |
| 100 | Slight discoloration | No abnormality |
| 200 | Discoloration, leakage | No abnormality |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for forming glass elements, comprising:
a moving shaft and a fixed shaft, said moving shaft and said fixed shaft being disposed in a vertical positional relation to each other;
heat insulating cylinders, said heat insulating cylinders being attached to the moving and fixed shafts;
top and bottom die assemblies, said top and bottom die assemblies being attached respectively to each of the heat insulating cylinders, the top die assembly comprising a top core mold, a top mold die which supports the top core mold, and a top die plate, the bottom die assembly comprising a bottom core mold, a bottom mold die which supports the bottom core mold, and a bottom die plate, a glass material being interposed between the top and bottom core molds;
a first fastening member, said first fastening member fastening the bottom mold die and the bottom die plate of the bottom die assembly together;
a second fastening member, said second fastening member fastening the bottom die plate of the bottom die assembly and the heat insulating cylinder together;
a third fastening member, said third fastening member fastening the top mold die and the top die plate of the top die assembly together;
a fourth fastening member, said fourth fastening member fastening the top die plate of the top die assembly and the heat insulating cylinder together; and
a heat insulating spacer, wherein the heat insulating spacer is interposed between each heat insulating cylinder and each shaft, each heat insulating cylinder is made of silicon carbide and each heat insulating spacer is made of silicon nitride,
wherein each of said first, second, third and fourth fastening members are made of a material selected from the group consisting of carbon and molybdenum.

2. The forming apparatus according to claim 1, wherein each of the first, the second, the third and the fourth fastening members are made of a material selected independently for each fastening member from the group consisting of carbon and molybdenum.

3. An apparatus for forming glass elements, comprising:
a moving shaft and a fixed shaft, said moving shaft and said fixed shaft being disposed in a vertical positional relation to each other;
heat insulating cylinders, said heat insulating cylinders being attached to the moving shaft and fixed shaft;
top and bottom die assemblies, said top and bottom die assemblies being attached respectively to each of the heat insulating cylinders, the top die assembly comprising a top core mold, a top mold die which supports the top core mold, and a top die plate, the bottom die assembly comprising a bottom core mold, a bottom mold die which supports the bottom core mold, and a bottom die plate, a glass material being interposed between the top and bottom core molds;
a heater configured to heat the top and bottom die assemblies and the glass material; and
a heat insulating spacer,
wherein said heat insulating spacer is interposed between each shaft and each heat insulating cylinder and said heat insulating spacer is made of silicon nitride.

4. The forming apparatus according to claim 3, wherein said heat insulating cylinder is made of silicon carbide.

5. The apparatus according to claim 3, further comprising:
a forming chamber, said forming chamber being formed so as to surround the top and bottom die assemblies and the heat insulating cylinders;
said heater comprising an infrared heater, said infrared heater being disposed along an outer periphery of the forming chamber so as to surround peripheries of the top and bottom die assemblies; and
a reflecting mirror, wherein said reflecting mirror is configured to reflect heat emitted from the infrared heater in the direction of the top and bottom die assemblies.

6. An apparatus for forming glass elements, comprising:
a forming chamber, said forming chamber having a closed space formed by a transparent quartz tube and plates provided above and below the transparent quartz tube;
top and bottom die assemblies, said top and bottom die assemblies being disposed within the forming chamber;
a glass material being disposed between the top and bottom die assemblies;
an infrared heater, said infrared heater being disposed around an outer periphery of said transparent quartz tube and configured to heat the glass material and top and bottom die assemblies;
a sealing member, said sealing member being provided to each of said plates and configured to prevent an inflow of air to enter into the forming chamber by sealing a space between each of said plates and said transparent quartz tube;
shielding plates, each of said shielding plates being disposed between the infrared heater and the sealing member, and each of said shielding plates being configured to substantially block radiant heat from the infrared heater to the sealing member; and
a cooling component, said cooling component configured to cool an outer peripheral surface of the transparent quartz tube present between the shielding plate and each plate by forcedly causing air to flow thereto.

7. The forming apparatus according to claim 6, wherein said sealing member is an O-ring selected from a group consisting of fluorocarbon resins and silicone resins.

* * * * *